(12) United States Patent
Orling et al.

(10) Patent No.: US 7,421,714 B1
(45) Date of Patent: Sep. 2, 2008

(54) SYSTEM AND METHOD FOR COOPERATIVE APPLICATION QUIESCENCE IN A COMPUTING ENVIRONMENT

(75) Inventors: Anthony T. Orling, San Luis Obispo, CA (US); Gary L. Phillips, Sanford, FL (US); Thomas W. Lanzatella, Minneapolis, MN (US); Elliot J. Murphy, Titusville, FL (US)

(73) Assignee: Symantec Operating Corporation, Mountain View, CA (US)

( * ) Notice: Subject to any disclaimer, the term of this patent is extended or adjusted under 35 U.S.C. 154(b) by 903 days.

(21) Appl. No.: 10/741,353

(22) Filed: Dec. 19, 2003

(51) Int. Cl.
*G06F 13/00* (2006.01)

(52) U.S. Cl. .............. 719/328; 719/318; 707/200; 707/201; 707/204

(58) Field of Classification Search ............ 719/318, 719/328; 707/200, 201, 204
See application file for complete search history.

(56) References Cited

U.S. PATENT DOCUMENTS

| | | | | |
|---|---|---|---|---|
| 5,991,768 | A * | 11/1999 | Sun et al. ............ | 707/104.1 |
| 6,101,528 | A | 8/2000 | Butt | |
| 6,286,047 | B1 * | 9/2001 | Ramanathan et al. ...... | 709/224 |
| 6,640,278 | B1 | 10/2003 | Nolan et al. | |
| 6,799,189 | B2 | 9/2004 | Huxoll | |
| 6,816,945 | B2 | 11/2004 | Harris et al. | |
| 6,850,945 | B2 * | 2/2005 | Lanzatella et al. ........ | 707/100 |
| 6,877,016 | B1 * | 4/2005 | Hart et al. ............... | 707/201 |
| 6,898,732 | B1 | 5/2005 | Trehus et al. | |
| 7,197,565 | B2 | 3/2007 | Abdelaziz | |
| 7,213,029 | B2 * | 5/2007 | Nelson et al. ........... | 707/103 R |
| 2003/0061279 | A1 | 3/2003 | Llewellyn et al. | |

OTHER PUBLICATIONS

Chris Evans, "Storage on the Shadows with VSS," Jul. 2, 2003, (5 Pages).
Paul Robichauz, "The Volume Shadow Copy Service," Mar. 7, 2003, (4 Pages).
Machiraju et al., "Towards Generic Application Auto-Discovery," Hewlett Packard, Jul. 1999, (13 Pages).
Visisser, linux-lvm mailing list entry, Jun. 8, 2000, (4 Pages).
U.S. Appl. No. 10/741,842, filed Dec. 19, 2003.

* cited by examiner

*Primary Examiner*—Andy Ho
(74) *Attorney, Agent, or Firm*—Robert C. Kowert; Anthony M. Petro; Meyertons, Hood, Kivlin, Kowert & Goetzel, P.C.

(57) ABSTRACT

A system and method for cooperative application quiescence in a computing environment. In one embodiment, a system may include a storage device configured to store data, a plurality of applications each of which is configured to issue input/output (I/O) requests to the storage device, and a quiescence manager configured to coordinate quiescence of at least a portion of the plurality of applications in response to receiving a quiescence request, where quiescence of a given application may include completing outstanding I/O requests issued by the given application.

23 Claims, 7 Drawing Sheets

SYSTEM AND METHOD FOR COOPERATIVE APPLICATION QUIESCENCE IN A COMPUTING ENVIRONMENT

BACKGROUND OF THE INVENTION

1. Field of the Invention

This invention relates to computer systems and, more particularly, to management of applications operable on computer systems.

2. Description of the Related Art

Computer systems are often configured to process large quantities of information in increasingly complex application environments. For example, innovations in information technology have led to numerous applications for collecting, managing, and processing data corresponding to a wide range of business activities, often in near-real time. Advances in multimedia and telecommunications have led to increasing management of audio, video, textual, and other types of information in the digital domain.

As more sophisticated solutions to information management problems evolve, computer systems typically become more complex, as do the applications running on them. An enterprise may find itself with thousands of computer systems under management, many with varying capabilities and different installed applications. Further, some complex applications may be distributed across numerous geographically dispersed computer systems. For example, a retail business may network thousands of point-of-sale terminals to a central server configured to operate an inventory management system. The inventory management system may be tightly linked to procurement and accounting systems in order to improve supply chain and financial management.

Reliability of system operation is often a critical factor for system performance, and consequently organizational performance. Loss of data or unavailability of various critical applications may cause substantial disruption. Referring to the previous example, loss of sale information, for example, may lead to significant problems in inventory management or even an inability to transact business.

To address reliability concerns, system management policies may be instituted to ensure that critical data is recoverable and critical applications available in the event of a system failure. However, as applications proliferate and become increasingly complex, ensuring that the proper applications are identified as critical and subsequently ensuring that all necessary components of such applications are properly protected against system failure becomes increasingly difficult. Further, as applications become more sophisticated, often numerous different applications may be configured to access and modify an underlying set of critical data. In such cases, obtaining a consistent state of such data for system management purposes, such as creating backups, may be complicated by the activity of the various applications accessing the data.

SUMMARY

Various embodiments of a system and method for cooperative application quiescence in a computing environment are disclosed. In one embodiment, a system may include a storage device configured to store data, a plurality of applications each of which is configured to issue input/output (I/O) requests to the storage device, and a quiescence manager configured to coordinate quiescence of at least a portion of the plurality of applications in response to receiving a quiescence request, where quiescence of a given application may include completing outstanding I/O requests issued by the given application. In some embodiments, a given application may include an operating system.

In one specific implementation of the system, a given application may be configured to internally buffer data, and quiescence of the given application may further include flushing the internally buffered data. In another specific implementation of the system, a quiescence request may specify a given resource set, which in some embodiments may include a set of files, volumes, or other resource specifiers. In such an implementation, the quiescence manager may be further configured to coordinate quiescence of at least a portion of the plurality of applications with respect to the given resource set in response to receiving the quiescence request, where quiescence of a given application with respect to a given resource set may include completing outstanding I/O requests issued by the given application that correspond to the resource set. In some embodiments, a given application may also be configured to internally buffer data, and quiescence of such a given application may include flushing internally buffered data.

A method is further contemplated that in one embodiment may include each of a plurality of applications issuing input/output (I/O) requests to a storage device, receiving a quiescence request, and coordinating quiescence of at least a portion of the plurality of applications in response to receiving the quiescence request, where quiescence of a given application may include completing outstanding I/O requests issued by the given application.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Storage System Overview

Figure 1:
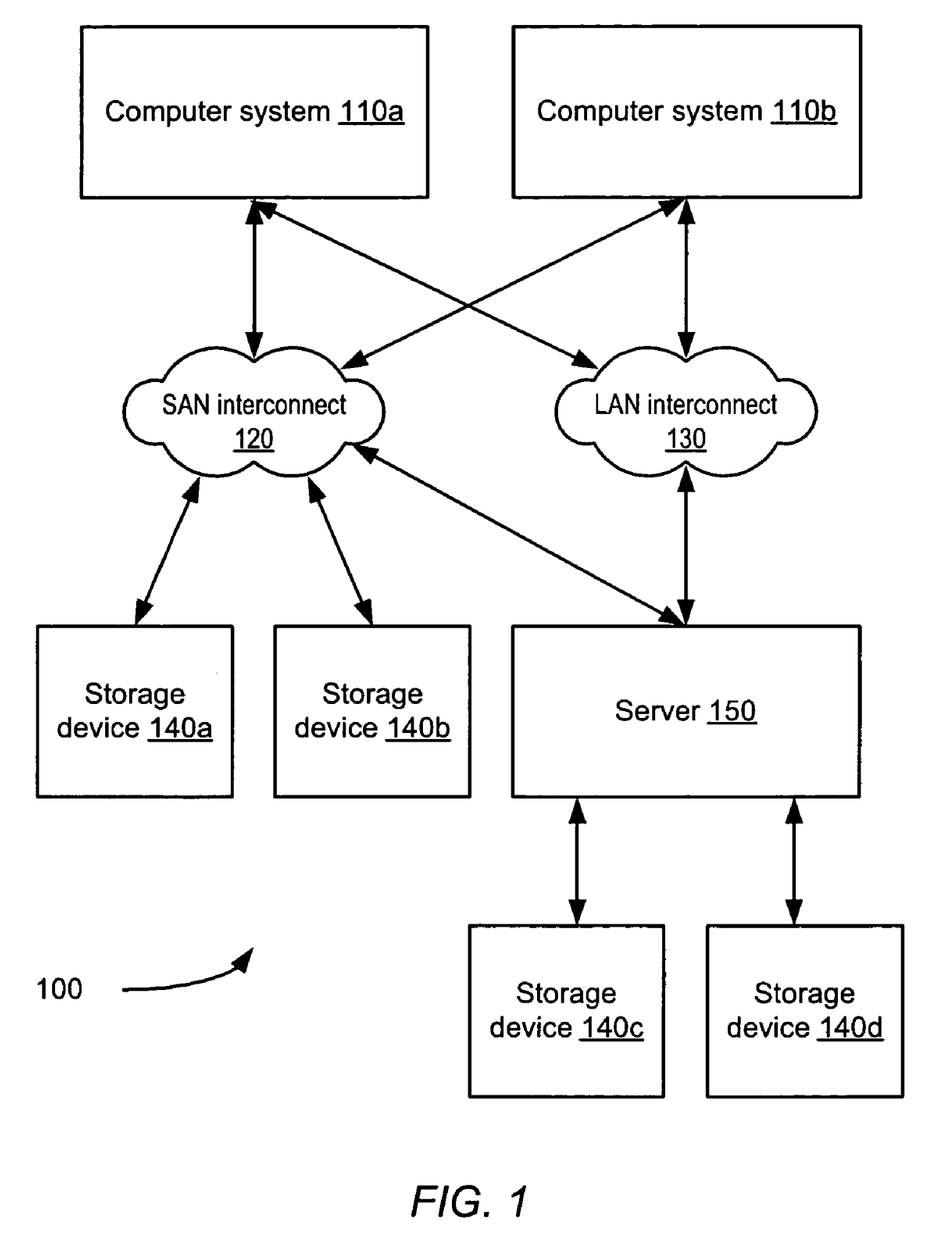
FIG. 1 is a block diagram illustrating one embodiment of a storage system.

Turning now to FIG. 1, a block diagram of one embodiment of a storage system is shown. In the illustrated embodiment, storage system 100 includes a plurality of computer systems 110a-b each coupled to a storage area network (SAN) interconnect 120 and a local area network (LAN) interconnect 130. System 100 also includes a server 150 coupled to SAN interconnect 120 and LAN interconnect 130 as well as a plurality of storage devices 140a-d. Storage devices 140a-b are coupled to SAN interconnect 120, while storage devices 140c-d are coupled to server 150.

Generally speaking, computer systems 110a-b may be any type of computer system configurable to perform operations on data, such as in response to executing program instructions. In various embodiments, computer systems 110a-b may be personal computers or workstations including microprocessors such as x86-compatible processors, PowerPC processors, or any other type of microprocessor, and may be configured to run various types of applications and operating systems. For example, a given computer system 110 may be configured to operate one or more of various versions of Microsoft Windows, Unix, Linux, MacOS, or any other operating system. In some embodiments, computer systems 110a-b may be standalone devices coupled to peripherals such as input devices and display devices, while in other embodiments computer systems 110a-b may be configured for mounting in equipment racks and accessed via a network. In still other embodiments, computer systems 110a-b may be hand-held devices such as personal digital assistants (PDAs), or other types of computing devices. In the illustrated embodiment, computer systems 110a-b are adapted for coupling to SAN interconnect and LAN interconnect 130, for example through network interface adapters (not shown). Although only two instances of computer systems 110a-b are shown, in some embodiments system 100 may include an arbitrary number of computer systems 110.

Like computer systems 110a-b, in general terms server 150 may be any type of computer system configurable to perform operations on data, such as in response to executing program instructions. In the illustrated embodiment, server 150 interfaces to storage devices 140c-d and provides access to these storage devices to other computer systems within system 100. In some embodiments, server 150 may interface to storage devices 140c-d using a peripheral bus such as the Small Computer System Interface (SCSI), AT Attachment Packet Interface (ATAPI), Universal Serial Bus (USB), IEEE 1394 ("Firewire"), or any suitable peripheral bus standard.

In a typical client/server or heterogeneous system, a given server 150 may include greater compute resources than a given computer system 110, such as a faster processor, more memory, and/or a faster network interface, for example. Also, in some heterogeneous system embodiments, server 150 may run a different operating system than computer systems 110. For example, if computer systems 110 run a client version of Windows, server 150 may run a server version of Windows or a completely different operating system such as a variant of Unix or Linux. However, in some relatively homogeneous system embodiments, computer systems 110a-b and server 150 may share similar hardware configurations, operating systems, and/or applications. It is also contemplated that in some embodiments, an arbitrary number of servers 150 may be employed.

In one embodiment, SAN interconnect 120 may be a high-speed data interface adapted for coupling to storage devices, such as a Fibre Channel interface, for example. In the illustrated embodiment, computer systems 110a-b as well as server 150 may be configured to access storage devices 140a-b directly through their interfaces to SAN interconnect 120. In some embodiments, SAN interconnect 120 may include components such as routers, hubs or switches or combinations of these. SAN interconnect 120 may be configured as a ring, a mesh, or another suitable topology.

LAN interconnect 130 may be a network configured for exchanging data among computer systems. For example, in some embodiments LAN interconnect 130 may be a wired network such as Ethernet or Token-Ring, or a wireless interface such as defined in the IEEE 802.11 family of protocols, or some combination of wired and wireless networking technologies. In some embodiments, LAN interconnect 130 may include components such as routers, firewalls, switches or access points or combinations of these. It is also contemplated that in some embodiments, LAN interconnect 130 may include functionality for connecting computer systems over longer distances, such as wide-area network (WAN) functionality. For example, LAN interconnect 130 may include WAN support for exchanging data among geographically remote computer systems, such as via a T1 or T3 telecommunications interface.

Generally speaking, storage devices 140a-d may be configured to store data for use by computer systems 110a-b and server 150. For example, storage devices 140a-d may be configured to provide storage for application data as well as for program instructions comprising executable code. Storage devices 140a-d may in various embodiments be any suitable type of device configured for data storage. For example, storage devices 140a-d may include magnetic disk- or tape-based storage devices such as hard disk drives, floppy drives or tape drives. Additionally, storage devices 140a-d may include optical storage devices such as read-only or writeable/rewritable CD or DVD drives. Storage devices 140a-d may also include various types of solid-state memory-based storage, such as virtual disks comprised of dynamic random access memory (DRAM), nonvolatile RAM (NVRAM or "Flash memory"), or erasable programmable read-only memory (EPROM), for example. It is contemplated that in some embodiments, system 100 may include an arbitrary number of storage devices 140. It is also contemplated that in some embodiments, one or more computer systems 110 may include one or more storage devices 140 connected locally via a suitable peripheral bus, in a manner similar to that described above for server 150. It is also contemplated that in some embodiments, a given storage device 140 may be a logical storage resource including one or more physical storage devices, such as a disk volume, for example. In some embodiments, physical details of logical storage resources (such as physical data organization, for example) may be processed internally to the logical storage resource and not presented to other devices interfacing with the logical storage resource. Finally, storage devices 140a-d may be exemplary of means for storing data, and each of the exemplary types of devices just described that storage devices 140 may include may be considered equivalent means for storing data.

Application Discovery

Numerous types of programs may execute on system 100 via computer systems 110a-b and server 150. As described above, computer systems 110a-b and server 150 may be configured to execute various types of operating systems. Additionally, numerous types of applications may be supported on system 100. For example, in one embodiment, system 100 may implement an email system for a workgroup, where server 150 provides centralized services for receiving, storing, and directing the exchange of email, and the various computer systems 110 provide email client applications whereby users may receive and compose messages. In another embodiment, system 100 may implement an enterprise-wide database system incorporating data from multiple departments such as order management, procurement, production, shipping, accounting, and human resources, for example. In such an embodiment, database content may be distributed throughout the system and stored on numerous storage devices 140, and various departments may enter and view database contents via general or customized interfaces provided by computer systems 110. Additionally, computer systems 110 and/or server 150 may be configured to perform complex queries of database contents, for example to create periodic reports of financial, production, or inventory status. Numerous other complex operations involving interactions of applications and data, whether distributed within system 100 or local to a particular computer system, are possible and contemplated. It is further contemplated that in some embodiments, multiple such applications may operate concurrently. For example, system 100 may be configured to concurrently provide email services, database services, document management services, and other types of data services via various applications.

In some embodiments, system 100 may perform numerous critical functions, the interruption of which may cause disruptions to users that range from delays and inconvenience to catastrophic data loss and an inability to conduct business. For example, system 100 may manage databases including customer contact information as well as procurement and order flow management for a just-in-time production operation. Loss of access to contact information due to system failure may result, e.g., in employees relying on memorized information or other sources for customer contacts, but a failure of order flow logistics may result in total production shutdown. Consequently, administrators of system 100 may draft protection policies for management of the system in order to ensure reliability and availability of critical functions. For example, in some embodiments system 100 may be configured with redundant resources such that failure of a particular device, such as a given storage device 140 or server 150, may not result in significant disruption of system operation. Also, in some embodiments, system administrators may create backup policies in which copies of important data, configuration information, and applications are regularly made, for example to tape or to a backup disk, such that this information may be restored in the event of a system failure.

Success of various reliability and availability policies may depend at least in part on the availability of information regarding how system 100 is configured, i.e., what applications, data, operating systems, and hardware, for example, are present within the system. Some applications, such as database applications, for example, may be deemed critical and targeted for specific protection policy measures such as daily backups, while other applications may be less significant and may have no specific associated policy.

However, a given application may be highly complex, with numerous components that may be distributed throughout the system. Further, such an application may have dependencies on other applications or operating system features. For example, a critical database application may be comprised of numerous different program files, site-specific configuration files, and data files, each of which may be located within various storage devices 140 within system 100. Additionally, such a database application may depend on certain library functions provided by the operating system, such as input/output-related functions, for example, in order to function. In another scenario, a given database may depend on another database for some of its inputs. For example, a production scheduling database may be linked to an order tracking database such that the data integrity of each database depends on the other. In yet another scenario, a web-based application such as a storefront, for example, may depend on one or more databases (e.g., for customer, order, inventory, or other data) as well as specific file system contents (e.g., HTML files specifying the structure and function of the web site), such that the integrity of each resource is necessary for the integrity of the application as a whole.

Additionally, system configuration may change over time. Applications and hardware may be added, upgraded, or replaced such that previous knowledge regarding system configuration becomes obsolete. Consequently, policies regarding protection of critical system functions may become stale. For example, an existing application may have had all of its relevant components previously identified for regular backups, but an application upgrade may result in components being added, deleted, or moved to different locations such that the backups no longer reflect the application configuration. Also, a new application may be installed, but if a policy for its protection is not identified at the time of installation or is deficient (such as due to oversight on the part of an administrator to institute such a policy, or an error in identifying all the components or dependencies of the application), the integrity of the new application may be at risk.

Figure 2:
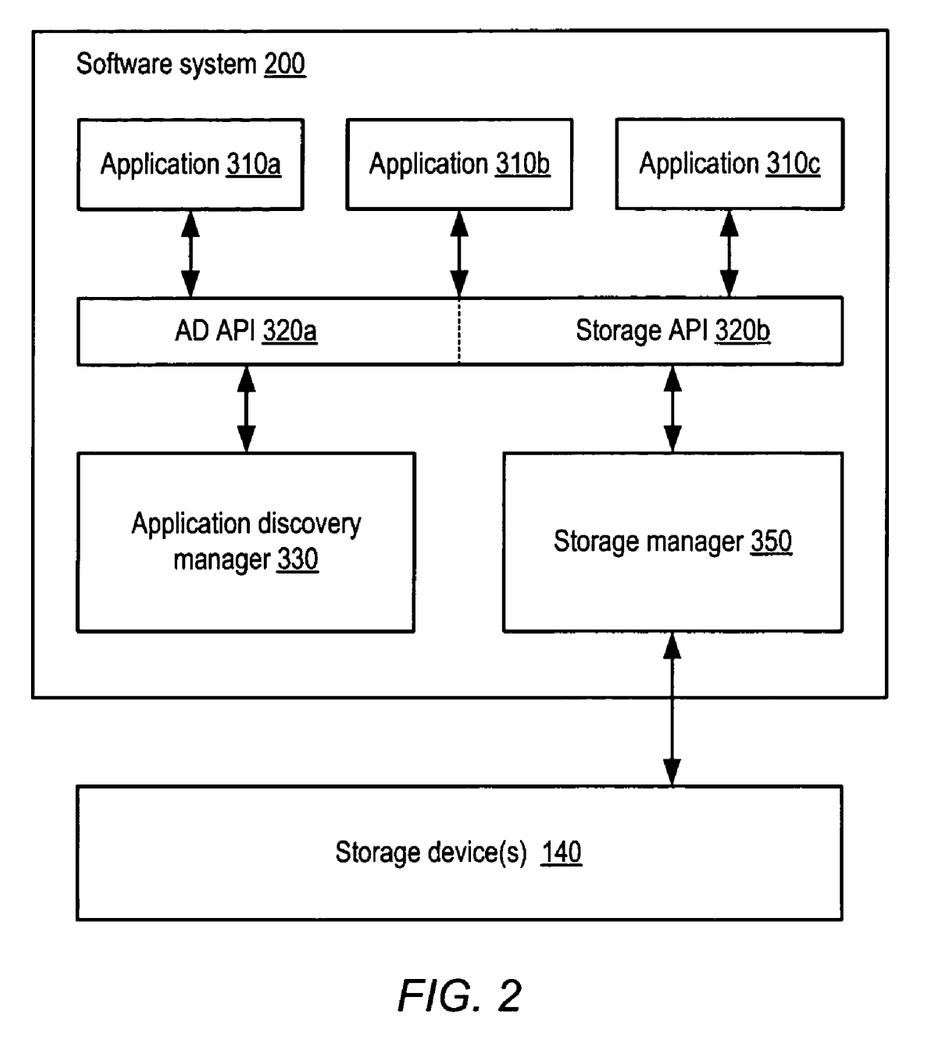
FIG. 2 is a block diagram illustrating one embodiment of a software system configured to provide an application discovery facility.

A software system operating on system 100 may be configured to provide a facility for the discovery of applications and their associated configuration and dependency information. One such embodiment of a software system is illustrated in FIG. 2. Software system 200 includes a plurality of applications 310*a-c* as well as an application discovery (AD) manager 330 and a storage manager 350. Applications 310*a-c* are configured to communicate with AD manager 330 via an AD application program interface (API) 320*a*. Applications 310*a-c* are also configured to communicate with storage manager 350 via a storage API 320*b*. Storage manager 350 is configured to manage access to one or more of the various storage devices 140 of system 100 illustrated in FIG. 1. In some embodiments, all of the components of software system 200 may be configured to operate on a single computer system 110 or server 150 of system 100, while in other embodiments various components of software system 200 may be distributed throughout system 100 as described in greater detail below.

Applications 310*a-c* may be any software application in various embodiments. For example, a given application 310 may be a user interface to a database or a query engine of that database, or any other type of application. In one embodiment, a given application 310 may comprise all or a portion of an operating system. For example, some portions of an operating system such as networking libraries may function as standalone applications or processes and may interact, for example, with storage manager 350 via storage API 320*b*.

In some embodiments, a given application 310 may be comprised of numerous components such as submodules, data components, and/or configuration components, as described above. In some such embodiments, a given application 310 may be distributed across several computer systems for execution, and the various components may be configured to communicate with one another such as via a network. For example, in one embodiment application 310*b* may denote an entire database system comprised of a central query engine, a data management module, and several user interfaces, each of which may operate on a distinct computer system. Also, in some embodiments two or more applications 310 may be configured to interact with one another via a commonly defined interface. For example, in one embodiment a database application 310*b* may be configured to interface with an email application 310*c* to automatically email database reports to specified recipients.

AD API 320*a* and storage API 320*b* may in one embodiment be distinct programming interfaces, while in another embodiment they may be part of a single common API. In some embodiments, each API 320 may include support, such as function calls and/or stub files, for a particular programming language such as the C language. For some such embodiments, multiple versions of each API 320 may be provided corresponding to specific programming languages, thus allowing applications 310 coded in different languages to gain access to system resources. In other embodiments, a given API 320 may be provided as an object interface in an object-oriented programming environment, such as the Common Information Model (CIM) interface standard directed by the Distributed Management Task Force (DMTF), for example.

In some embodiments, various applications 310 may be configured to access data stored on one or more storage devices 140. Storage manager 350 may be configured to manage the physical details of organizing, storing, and retrieving data stored on storage devices 140, while providing a consistent logical data storage interface to applications 310. In one embodiment, storage manager 350 may implement a storage stack or hierarchy of functions. For example, storage manager 350 may implement a file system configured to organize all or a portion of storage devices 140 as a hierarchy of files. Storage manager 350 may further be configured to map files to particular storage volumes, which may then be mapped to actual physical locations on particular storage devices 140. In such an embodiment, storage manager 350 may manage differences in size, type, and configuration of various storage devices 140 such that various applications 310 need not do so. For example, storage devices 140 may include numerous different types of storage as described above, both remote and local to a particular computer system on which a given application is running. A given application 310 may request access to a particular file via storage API 320b without any detail as to where such a file physically resides. Storage manager 350 may then map the requested file to the appropriate storage device or devices 140 and return the requested data. It is contemplated that in alternative embodiments, storage manager 350 may provide a non-file based organization for storage devices 140. For example, in one embodiment storage manager 350 may manage storage devices 140 as a relational database.

Application discovery (AD) manager 330 may be configured to detect the presence of one or more of applications 310 within software system 200. In some embodiments, AD manager 330 may be configured to detect additional detailed information regarding a particular application 310, such as specific components or files of that application that are present in a particular installation, as well as details about how the application is configured, its dependencies on other applications, etc. For example, AD manager 330 may be configured to detect that a particular database application 310 is installed on software system 200. Upon determining that the database is present, AD manager 330 may be configured to further determine specific components of the database application are installed, such as a query engine and various user interfaces, for example. AD manager 330 may further resolve specific components down to the level of files or other storage entities. For example, AD manager 330 may determine specific files stored on storage devices 140 corresponding to data, configuration, and executable code of the database application. Additionally, AD manager 330 may determine that the detected database application is dependent on another application, for example in a complex computing environment in which several discrete databases are configured to track different but related data sets. In some embodiments, the various types of information determined by AD manager 330 may be used to identify proper protection policies for the components of a system. For example, AD manager 330 may be used to construct a detailed inventory regarding installed applications and their components and data, which may be used to determine a strategy for backing up critical applications and data. Additionally, AD manager 330 may be configured to determine the ability of a given application 310 to participate in various protection tasks (such as whether an application implements a quiescence interface, as described in greater detail below) and may provide an interface whereby applications 310 may negotiate the level of participation they require in such protection tasks. For example, an application 310 that implements complex transactions may indicate to AD manager 330 that it should be notified in case of operations to its data set (e.g., backup operations) so that it may properly synchronize outstanding transactions to its data set.

Broadly speaking, detection of the presence of a given application may be referred to simply as "detection," while determination of more detailed information regarding a specific application may be referred to as "inspection." Both detection and inspection may generically be referred to as application discovery activities. In some embodiments, AD manager 330 may be configured to perform inspection on every application it detects. In other embodiments, criteria may be used to determine which detected applications will be inspected. For example, in one embodiment AD manager 330 may include submodules or subroutines, also referred to as "providers." In such an embodiment, a given provider may be configured to query the application environment (i.e., software system 200 operating on storage system 100) for information regarding a particular set or class of applications. For example, one given provider may be configured to query the application environment for information regarding database types of applications, while another may be configured to query for office-type applications (e.g., word processors, spreadsheets, presentation tools, etc.). In some such embodiments, a provider for one type of application may be configured only to perform detection of instances of that type of application, while a provider for another type of application may be configured to perform both detection and inspection of instances of that type of application. In another such embodiment, a provider may be configured to select whether to inspect or not based on the specific application instance detected. For example, a provider configured to detect the presence of database applications may be configured to perform inspection only on databases provided by certain vendors.

AD manager 330 may implement a variety of techniques for application detection and inspection. For example, in one embodiment AD manager 330 may provide a platform-independent application programming interface (API), for example as part of AD API 320a, whereby a given application 310 may register itself upon installation or invocation. Such a platform-independent API may be made accessible to the various applications 310 within a software system irrespective of the particular computing platform (such as operating system and hardware configuration) a given application is configured for. AD manager 330 may also be configured to probe APIs of specific types of applications for either detection or inspection, for example by issuing function calls to those specific types of applications. It is contemplated that in some embodiments, a given application 310 may participate in its own detection and inspection, such as by initiating an application discovery operation with respect to itself via an API or other mechanism, actively notifying AD manager 330 of its presence at installation or initialization, by querying AD manager 330 for information about its configuration such as described in greater detail below, or any combination of these or other techniques.

In some embodiments, AD manager 330 may be configured to implement further indirect techniques for application detection and inspection. For example, AD manager 330 may be configured to scan the processes currently running or scheduled to run on a given computer system, such as by listing currently running processes via an operating system call or scanning well-known locations of a file system to identify files listing processes scheduled to run. AD manager 330 may further be configured to monitor the activities of processes, for example to detect the interaction a given process has with other applications or a file system, thereby assisting in identifying application dependencies. Additionally, AD manager 330 may be configured to scan file system contents (e.g., files and directories) to detect the presence of an application as well as to inspect specific file-based components of an application. If a given operating system platform on a particular computer system provides a registry service (e.g., the Windows registry, among many others), AD manager 330 may be configured to query such a registry to identify installed applications and to inspect details regarding configuration of such applications. AD manager 330 may also be configured to process user- or vendor-provided lists of installed applications and/or detailed information regarding application components.

Numerous other techniques for application detection and inspection are possible and contemplated. Additionally, in embodiments of AD manager 330 that are configured to include different providers for, e.g., different applications types as described above, the various providers may each implement different combinations and configurations of the aforementioned techniques. For example, a vendor-specific provider may be configured to primarily query public APIs or private mechanisms undisclosed by the vendor to detect and inspect instances of a specific vendor's applications, while a generic office application provider may be configured to primarily scan well-known file system locations to detect instances of office applications. Other embodiments of AD manager 330 that do not use the provider organization are also contemplated; for example, in various embodiments AD manager 330 may be organized as a database or a single procedural block of code.

Once information regarding the presence of various applications as well as their detail has been determined, other applications may benefit from being able to access such information. In one embodiment, AD manager 330 may be configured to provide a platform-independent API, for example via AD API 320a, whereby a given application 310 may query for application details resulting from the previously described detection and inspection activities. Through such an API, AD manager 330 may be configured to decouple the presentation of information regarding application presence and configuration from the underlying techniques used to determine that information.

In some embodiments, AD manager 330 may be configured to dynamically perform detection and inspection activities in response to a query from another application 310, referred to as a requestor. In some such embodiments, a requestor may be configured to make queries of varying scope. For example, a requestor may query AD manager 330 for all available information regarding all detected applications. Alternatively, a requestor may query AD manager 330 for information regarding certain types or classes of applications, such as a type represented by a particular provider included in AD manager 330. In some embodiments, a requestor may specify the degree of detection desired, such as detection but not inspection, for example.

AD manager 330 may additionally or alternatively be configured to store information about applications resulting from detection and inspection activities, for example in a database or other data structure, and to provide stored information to requestors in response to queries. For example, in some embodiments performing a complete inventory using both detection and inspection techniques may consume considerable time and system resources. Correspondingly, such activities may be scheduled to run at selected intervals, with the results stored for later use. In some such embodiments, requesters may have the option of specifying whether to receive stored data in response to a query, or to cause detection and inspection activity to be performed anew in response to a query (for example, to detect a newly installed application).

While AD manager 330 may be configured to detect various components and dependencies corresponding to a given application, such as via the detection and inspection processes just described, in some embodiments AD manager 330 may also be configured to discover one or more applications that correspond to a given resource. For example, in some embodiments the various resources detected by AD manager 330 during discovery and inspection of given applications 310 may be stored in a database or other data structure such that mappings may be queried either from a given application to its associated resources, or from a given resource to its associated applications. Resource-based application discovery may be useful in enabling system 200 to identify specific applications corresponding to particular resources, thereby enabling protection policies associated with resources to be propagated to associated applications, for example. Additionally, such resource-based discovery may be used in conjunction with application quiescence features, as described in greater detail below.

It is noted that in some embodiments, software system 200 may be implemented in a distributed computing environment, wherein different applications 310 may be installed and may operate on different computer systems. In some such embodiments, an instance of AD manager 330 may be configured on each computer system and configured to perform application discovery activities primarily with respect to that particular computer system. In other embodiments, AD manager 330 itself may be distributed across different computer systems. For example, different components of AD manager 330 such as providers may be configured on different computer systems, and may interact with modules on other computer systems to perform application discovery activities with respect to the whole storage system 100.

Further, in some embodiments AD manager 330 may be configured to provide application-level management perspectives to other applications 310 within software system 200. For example, AD manager 330 may enable a protection policy to be drafted at the level of an entire application, such as a database application. A system administrator may thereby identify specific applications for various actions, such as backup activities, where the various applications 310 implementing those actions (such as a backup utility, for example) may interact with AD manager 330 to identify specific application resources (e.g., components, directories, and files) corresponding to the requested actions.

Figure 3:
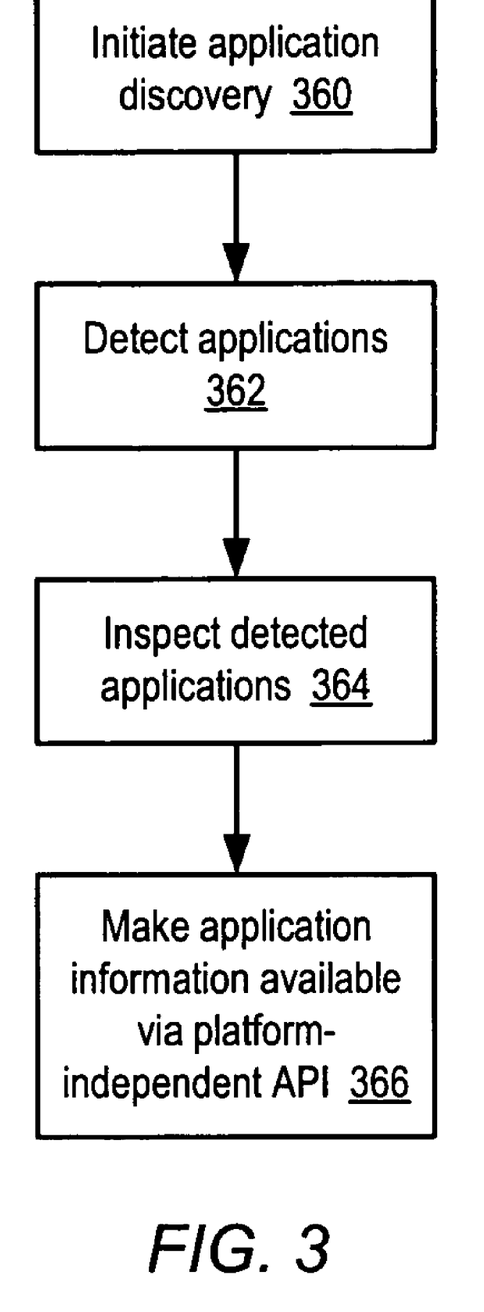
FIG. 3 is a flow diagram illustrating one embodiment of a method of performing application discovery.

FIG. 3 illustrates one embodiment of a method of application discovery. Referring collectively to FIG. 1 through FIG. 3, operation begins in block 360 where an application discovery operation is initiated. In various embodiments, as described above, application discovery activity may be initiated in response to a request for application information by a given application 310. Alternatively or in addition, application discovery activity may be initiated by AD manager 330 in the absence of a request from an application, for example when a given computer system is initialized or on a scheduled basis.

After application discovery operation is initiated, various applications may be detected (block 362). In one embodiment, AD manager 330 may be configured to detect the presence of applications installed on software system 200 using any of the techniques described above, as well as other techniques. In some embodiments, AD manager 330 may be configured to scan for all types of applications, while in other embodiments only particular types or classes of applications may be detected. For example, as described above, AD manager 330 may include one or more providers configured to detect specific types of applications. In some embodiments, a requestor may indicate that only certain types of applications are to be detected, in which case only certain providers may be activated.

Some or all detected applications may also be inspected in detail, for example to determine details regarding application components or configuration (block 364). As described above, in some embodiments some applications may be inspected while others may not, or all applications may be inspected in as much detail as possible. In some embodiments, whether or not a detected application is inspected may be specified by a requesting application initiating application discovery.

Application information gathered during the previous steps of the discovery process may be made available to other applications via a platform-independent API (block 366). For example, AD manager 330 may return detection and inspection information to a requesting application that initiated the application discovery process via AD API 320a. Alternatively or additionally, AD manager 330 may store application information resulting from application discovery internally, such as in a database or other data structure. AD manager 330 may then provide such information to requesting applications without necessarily initiating the application discovery process in response to such requests.

Application Quiescence

As described above, in some embodiments, system 100 of FIG. 1 is configured to run one or more applications, each of which may be configured to access data stored on storage devices 140, and each of which may be of some considerable degree of complexity. For example, a given application may be comprised of numerous code, data, configuration, and other components and its operation may be distributed for operation among a number of computer systems. Additionally, as previously described, a given application may be subject to a protection policy in order to ensure its integrity in the event of system failure. In one instance, such a protection policy may include regularly creating a backup copy of the given application and/or selected components. For example, one database protection policy may specify creating backup copies only of the records included in the database, whereas another policy may specify creating backup copies of the entire database application including executable program files, libraries, and other resources.

In one embodiment, backup copies may be created during the course of system operation by creating an exact copy of specified application components from their various locations within storage devices 140 to an area of storage reserved for such backups. For example, as described above, storage manager 350 of FIG. 2 may organize storage devices 140 into a hierarchy of files, and some areas of the hierarchy may be actively used by a given application. In some embodiments, a An otherwise-unused area of the hierarchy may then be used to store a copy of specified application components during creation of a backup copy. Such a backup copy may also be referred to as a "snapshot" or "frozen image" of the specified components. In some embodiments, a frozen image may be created directly on an archival storage medium such as tape storage, while in other embodiments, a frozen image may be created on faster storage such as hard disk storage, and subsequently archived to another medium if desired.

Creating a frozen image of a given application or selected data subject to modification by an application while the application is operating presents certain synchronization challenges, as the data to be frozen may be in flux at the time the frozen image occurs. Additionally, various types of applications may employ data-handling abstractions that may not be visible at the level of a file system or a particular storage device, such as the transactions described in greater detail below. It may be important for the data integrity of a given application for a data image to be consistent with respect to such abstractions.

In some embodiments, a given application may be configured to buffer or cache data internally. For example, to improve performance a database application may retain modified data in an internal buffer for an arbitrary period of time before the modified data is reflected in a write request to storage devices 140. Thus, data stored in storage devices 140 may not be consistent with the most current version of data known to a given application.

Also, a given application may in some embodiments be configured to implement complex transactions, some of which may include multiple input/output (I/O) requests to storage devices 140. Further, atomicity of certain transactions may be necessary for correct application performance. For example, in one embodiment a financial accounting system may be configured to manage transactions among several accounts. In such a system, a single transfer transaction between two accounts may result in multiple I/O requests to modify data as one account is debited and the other is credited. However, if an image of the data is created after only a portion of the I/O requests have completed, the image data may be in an inconsistent state with respect to the transaction. Thus, at any given time data stored in storage devices 140 may not be consistent with respect to a given application's transactions in progress, i.e., a particular transaction associated with such data may not be fully committed to data storage.

In some cases, data inconsistencies such as resulting from the foregoing scenarios may degrade the data integrity of a system. For example, if a frozen image of inconsistent data were created and subsequently used to restore the corresponding application (e.g., after a system failure), data loss or erroneous application behavior may occur. Such data inconsistencies may be avoided in some embodiments by placing the corresponding applications in a quiescent state prior to performing a consistency-sensitive operation on storage devices 140, such as frozen image creation, for example. In one embodiment, quiescence of a given application may include completing outstanding I/O requests issued by that application. In embodiments where a given application may buffer data internally, quiescence of that application may include flushing internally buffered data such as by generating write I/O requests. It is noted that other consistency-sensitive operations beyond frozen image creation are possible and contemplated. For example, system maintenance procedures may occasionally require that a particular physical storage device or logical storage volume be taken offline for a period of time, such as for replacement or repair. These procedures as well as other types of operations may risk data loss or other undesirable behavior if applications accessing the relevant devices or volumes are not quiescent prior to beginning the operation.

Figure 4:
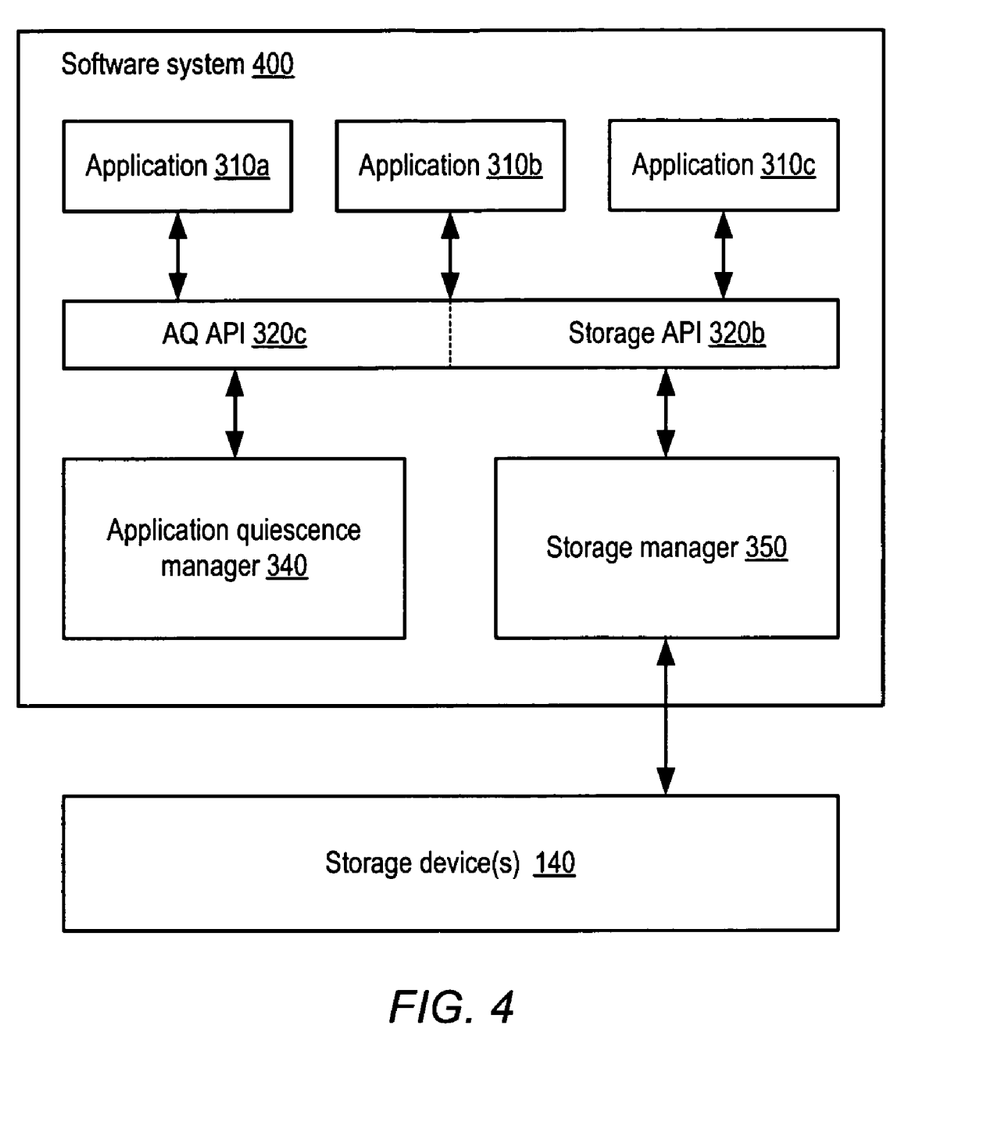
FIG. 4 is a block diagram illustrating one embodiment of a software system configured to provide a facility for coordinating the quiescence of applications.

A software system operating on system 100 may be configured to provide a facility for coordinating quiescence of applications. One embodiment of such a software system is illustrated in FIG. 4. Software system 400 includes a plurality of applications 310a-c as well as an application quiescence (AQ) manager 340 and a storage manager 350. Applications 310a-c are configured to communicate with AQ manager 340 via an AQ application program interface (API) 320c. Applications 310a-c are also configured to communicate with storage manager 350 via a storage API 320b. Storage manager 350 is configured to manage access to one or more of the various storage devices 140 of system 100 illustrated in FIG. 1. In some embodiments, all of the components of software system 400 may be configured to operate on a single computer system 110 or server 150 of system 100, while in other embodiments various components of software system 400 may be distributed throughout system 100. It is noted that AQ manager 340 may also be referred to herein as a quiescence manager.

Applications 310a-c, storage API 320b, and storage manager 350 in one embodiment may each be illustrative of the corresponding components illustrated in FIG. 2 and described above. AQ API 320c may in one embodiment be a distinct programming interface from storage API 320b, while in another embodiment the two may be part of a single common API. Like storage API 320b described above, in some embodiments, AQ API 320c may include support, such as function calls and/or stub files, for a particular programming language such as the C language. For some such embodiments, multiple versions of each API 320 may be provided corresponding to specific programming languages, thus allowing applications 310 coded in different languages to gain access to system resources. In other embodiments, a given API 320 may be provided as an object interface in an object-oriented programming environment, such as the Common Information Model (CIM) interface. In some embodiments, it is contemplated that AQ API 320c may be a platform-independent interface, such that applications 310 running under different operating systems and on different types of underlying computer system hardware may access the services of AQ manager 340 in a consistent manner.

In some embodiments, various applications 310 may be configured to access data stored on one or more storage devices 140. As described above in conjunction with the description of FIG. 2, in some embodiments storage manager 350 may be configured to manage the physical details of organizing, storing, and retrieving data stored on storage devices 140, while providing a consistent logical data storage interface to applications 310. For example, storage manager 350 may implement a storage stack that maps logical file names through a file system to volumes and underlying physical locations on storage devices 140. Also as noted above, it is contemplated that in alternative embodiments, storage manager 350 may provide a non-file based organization for storage devices 140. For example, in one embodiment storage manager 350 may manage storage devices 140 as a relational database.

During the course of operation of software system 400, various applications 310 may be configured to generate quiescence requests. For example, a given application 310 in one embodiment may be a backup utility configured to generate frozen images of applications, application data, directories, files, or particular storage devices. In another embodiment, a given application 310 may be a system management utility configured to unmount a logical storage volume in preparation for storage maintenance, such as a restore operation or a storage device addition or replacement. Generally speaking, any type of application that may perform a storage-related operation for which application quiescence is desired may be configured to generate a quiescence request.

In the illustrated embodiment, AQ manager 340 may be configured to respond to such quiescence requests. AQ manager 340 may be structured like an application in some embodiments, in that it may be comprised of several software modules that interact to provide quiescence manager services. For example, in some embodiments, a given application 310 may be configured to operate on several computer systems concurrently in a distributed fashion, as described above. Correspondingly, AQ manager 340 may in some embodiments be distributed for operation on several computer systems, so that it may coordinate quiescence of each distributed component of the given application 310. In some embodiments, the function of AQ manager 340 may be incorporated into other modules of a software system. For example, in embodiments where both AQ and AD services are provided as described in greater detail below, both types of services may be incorporated into a single software module. Alternatively, in some embodiments, the function of AQ manager 340 may be incorporated into storage manager 350.

AQ manager 340 may be configured in one embodiment to respond to different types of quiescence requests. In one instance, a given application 310 may generate a quiescence request that is specific to a particular set of system resources, such as files, directories, volumes, storage devices, or another type of system resource specification. For example, a backup utility as described above may generate a quiescence request specific to a particular logical volume. In making a resource-based quiescence request, some embodiments of applications 310 may specify to AQ manager 340 the resources for which data consistency is desired. AQ manager 340 may maintain information, such as tables, lists, databases, or other structures, regarding the various applications 310 that interact with various storage resources. For example, in system embodiments that also support application discovery as described above, AQ manager 340 may be configured to receive information regarding applications and their associated resources that was generated during application discovery. In response to receiving a particular resource-based quiescence request, such an embodiment of AQ manager 340 may be configured to consult such information, such as by interacting with AD manager 330, to determine for which applications 310 quiescence should be coordinated, if any. In system embodiments that do not support application discovery, AQ manager 340 may be configured to internally maintain information about the mapping of resources and applications, or may omit support for resource-based quiescence requests.

In another instance, a given application 310 may generate a quiescence request that is specific to a particular application 310. For example, a database administrator may wish to perform a maintenance operation on an entire complex database system, and may use a maintenance utility application to request quiescence of the entire database application 310. In one embodiment, AQ manager 340 may receive information identifying the particular application for which quiescence is to be coordinated as part of the quiescence request, and may proceed directly with coordinating quiescence of the specified application without undertaking the resource-indexing step described above.

In addition to the direct or resource-based methods of application identification just described, in some embodiments applications may have dependencies on each other, such that quiescence of one application may require quiescence of another application. In such embodiments, AQ manager 340 may maintain application dependence information, or may obtain such information from another module. AQ manager 340 may be configured to use such application dependence information to identify additional applications corresponding to a particular quiescence request, as well as a particular order in which quiescence of such applications should be coordinated.

Once one or more applications corresponding to a particular quiescence request have been identified, whether directly, through indexing of resource specifications as described above, or through some other means, AQ manager 340 may coordinate quiescence of the identified applications. In one embodiment, various applications 310 may implement standard quiescence mechanisms specified by AQ API 320c. For example, such applications 310 may expose a quiescence interface to AQ manager 340. In one such embodiment, AQ manager 340 may issue quiescence function calls to the applications corresponding to a quiescence request, or may invoke the applications' quiescence interface in another manner. In response to a function call or other invocation of its quiescence interface, a given application 310 may cease generating new I/O requests to storage devices 140, and if it has internally buffered data, may take steps to flush that data such as by issuing write I/O requests specific to the buffered data. The given application 310 may additionally wait to receive an indication that outstanding I/O requests (such as requests in progress when its quiescence interface was invoked, or subsequently issued flush requests) have been completed. For example, given application 310 may wait for storage manager 350 to indicate completion of outstanding requests. After outstanding I/O requests are completed, given application 310 may indicate to AQ manager 340 that it is in a quiescent state. Alternatively, AQ manager 340 may interface directly with storage manager 350 to determine when outstanding requests of given application 310 have been completed, or may poll given application 310 at intervals to determine whether it has entered a quiescent state.

In embodiments where given application 310 is distributed for operation among multiple computer systems, AQ manager 340 may be configured to coordinate quiescence of all instances or components of given application 310 on the various systems by interfacing with each instance or component directly in a manner similar to that just described. Alternatively, in some embodiments, such a distributed application 310 may be configured to internally distribute a quiescence request received from AQ manager 340.

Once all applications corresponding to a particular quiescence request have acknowledged their quiescence, AQ manager 340 may be configured to communicate this fact to the original requestor, which may subsequently continue with the consistency-sensitive operation for which the quiescence request was generated. In some embodiments, quiescent applications may remain in a quiescent state until released. In some such embodiments, the original requesting application 310 may indicate to AQ manager 340 when its previous quiescence request is no longer required, and AQ manager 340 may responsively notify the corresponding applications via their quiescence interface.

In some embodiments, a given application 310 may respond negatively to an invocation of its quiescence interface by AQ manager 340, or it may respond with a maximum time interval for which it is prepared to be quiescent. For example, a database application may not be able to enter or remain in a quiescent state for an arbitrary length of time without impacting a quality-of-service policy such as response time. Correspondingly, such a database application may indicate that it cannot comply with the quiescence request, or can remain quiescent for only a certain period of time. If any of the applications corresponding to a particular quiescence request respond negatively, AQ manager 340 may be configured to inform the original requesting application that quiescence cannot be achieved, such as through an error condition. If one or more applications respond with a maximum time interval of quiescence, AQ manager 340 may be configured to indicate the minimum of those intervals to the original requesting application, which may then determine whether or not to proceed with its operation.

Additionally, a given application 310 may not expose a quiescence interface to AQ manager 340 in some embodiments. If such an application is identified in response to a quiescence request, AQ manager 340 may signal an error condition to the original requesting application. In some such embodiments, AQ manager 340 may attempt to place the identified application in a quasi-quiescent state through other means, such as by attempting to suspend the application. If AQ manager 340 is successful in this attempt, it may respond to the original requesting application with a warning indicating that one or more applications corresponding to the quiescence request is in a quasi-quiescent state. The original requesting application may then determine whether or not to proceed with its operation.

As noted above, quiescence of applications may be requested on the basis of a set of resources in some embodiments, where AQ manager 340 may be configured to coordinate quiescence of the applications associated with those resources. In some such embodiments, AQ manager 340 may be further configured to coordinate the quiescence of a given application with respect to a specified set of resources. For example, a quiescence request may be generated with respect to a particular logical volume, directory, or other resource. After identifying the various applications 310 that may access the specified resource, AQ manager 340 may interface with the identified applications 310 to coordinate their quiescence, as described previously. In the course of interfacing with the identified applications 310, AQ manager 340 may provide information regarding the resource set specified in the original quiescence request. For example, AQ manager 340 may provide directory names, file names, or other resource information to one or more of the identified applications 310. A given application 310 may be configured to use the supplied resource information to perform quiescence steps with respect to only the specified resource set. For example, a given application 310 may variously suspend issuing I/O requests, flush internal data buffers, and wait for completion of I/O requests with respect to the specified resource set, while allowing other I/O activity to continue to resources not specified for quiescence. Thus, in some cases, a given application 310 may continue operating normally following invocation of its quiescence interface, for example if the given application 310 had no outstanding I/O requests or dirty buffers corresponding to the specified resource set and generated no new I/O requests to that resource set before the quiescence request was released.

Additionally, in some embodiments certain resources may be specified as being exempt from quiescence activities. For example, due to the transient nature of their contents, in some embodiments log files may be considered of low importance and accorded minimal protection policies, and the overhead of coordinating quiescence of applications with respect to log files may be undesirable. In some such embodiments, AQ manager 340 may be configured to provide information identifying exempt resources to one or more applications 310 identified for quiescence in a manner similar to specifying a resource set as described above. In other embodiments, characteristics of exempt resources (such as file names, directories, file extensions, or other information) may be specified in a file or other storage location accessible by applications 310. A given application 310 may be configured to use information about exempt resources to allow I/O requests or other activity to continue to such exempt resources even after AQ manager 340 has invoked the quiescence interface of given application 310.

In a given implementation of software system 400, multiple quiescence requests from one or more applications 310 may occur concurrently. In one embodiment, AQ manager 340 may be configured to process such requests concurrently. In case multiple requests specify the same or overlapping sets of applications or resources, AQ manager 340 may be configured to employ a prioritization scheme to order the quiescence requests, for example in the order the requests were received.

In some embodiments, storage manager 350 may maintain internal data buffers that may contain data that is more recent than corresponding data stored on storage devices 140, or storage manager 350 may report completion of an I/O request to an application before the I/O request has been committed to storage devices 140. In some such embodiments, AQ manager 340 may coordinate quiescence of applications 310 with respect to the logical storage interface provided by storage manager 350, and it may be possible that a given application is quiescent with respect to the logical storage interface but not storage devices 140. Where this is the case, in some embodiments storage manager 350 may provide separate internal quiescence mechanisms to ensure quiescence of the storage stack beneath the logical storage interface with respect to storage devices 140. In some such embodiments, storage manager 350 may maintain a separate interface with AQ manager 340 to indicate when the storage stack is quiescent, and AQ manager 340 may incorporate such an indication in its indication of application quiescence to a quiescence requestor.

Figure 5:
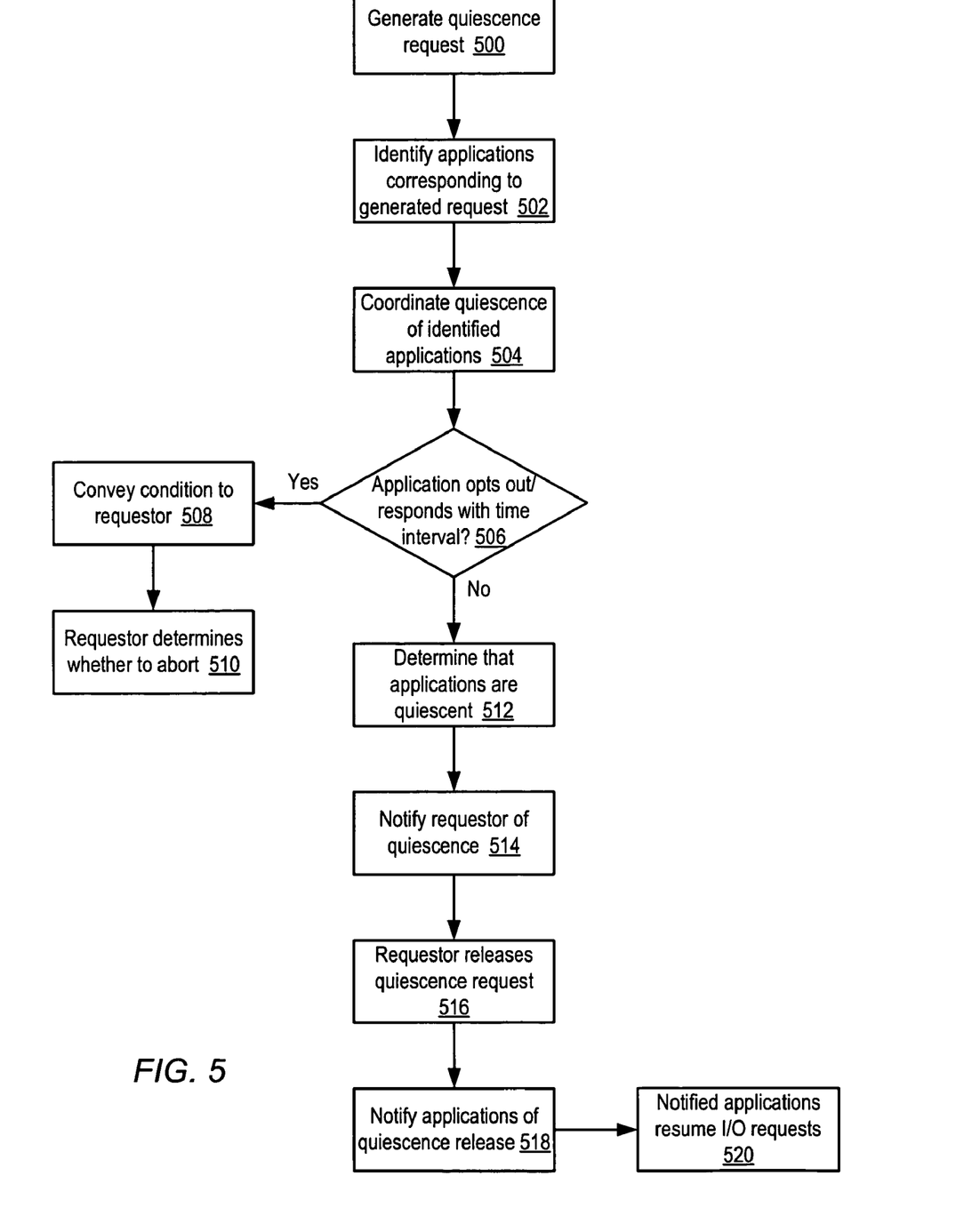
FIG. 5 is a flow diagram illustrating one embodiment of a method of coordinating quiescence of applications.

FIG. 5 illustrates one embodiment of a method of coordinating quiescence of applications. Referring collectively to FIG. 1, FIG. 4, and FIG. 5, operation begins in block 500 where a quiescence request is generated. For example, as previously described, in one embodiment a given application 310 may be configured to generate a quiescence request either with respect to another application or a set of resources, prior to commencing an operation on certain storage resources.

Subsequent to generation of the quiescence request, applications corresponding to the request may be identified (block 502). In one embodiment, AQ manager 340 may be configured to receive the quiescence request, for example via AQ API 320*c*, and subsequently to identify applications 310 corresponding to that request. AQ manager 340 may maintain internal information regarding how applications 310 map to various storage resources, such as files, directories, or volumes, and may be configured to use such information to identify applications 310 corresponding to a particular resource-based quiescence request.

Once applications corresponding to a quiescence request have been identified, their quiescence may be coordinated (block 504). For example, in one embodiment AQ manager 340 may signal the identified applications 310 via their exposed quiescence interfaces. Responsively, the signaled applications 310 may take steps such as suspending issuing new I/O operations, flushing internally buffered data if present, and allowing outstanding I/O operations to complete.

In one embodiment, a given application 310 may opt out of a quiescence request by responding negatively to AQ manager 340, or may respond with a maximum time interval for which it can assure quiescence (block 506). In this event, AQ manager 340 may convey an error or advisory condition to the application originally generating the quiescence request (block 508). In response, the requesting application may determine whether to abort or continue the request (block 510).

If a given application 310 does not opt out of the quiescence request, in one embodiment it may subsequently signal AQ manager 340 that it is in a quiescent state, for example in response to storage manager 350 confirming that outstanding I/O requests have completed (block 512). Alternatively, AQ manager 340 may interact directly with storage manager 350 or may poll given application 310 directly to determine when given application 310 is in a quiescent state. After such a signal or determination is received for each identified application corresponding to the quiescence request, the application generating the quiescence request may be notified that the relevant applications are quiescent (block 514). In some embodiments, an application may be quiescent with respect to a particular set of resources, but may continue allowing I/O requests to other resources.

Subsequently, in one embodiment the application generating the quiescence request may release the request (block 516). In response, AQ manager 340 may be configured to notify the identified applications of the quiescence release (block 518), and the notified applications may responsively resume generating I/O requests to the previously specified resources (block 520).

Figure 6:
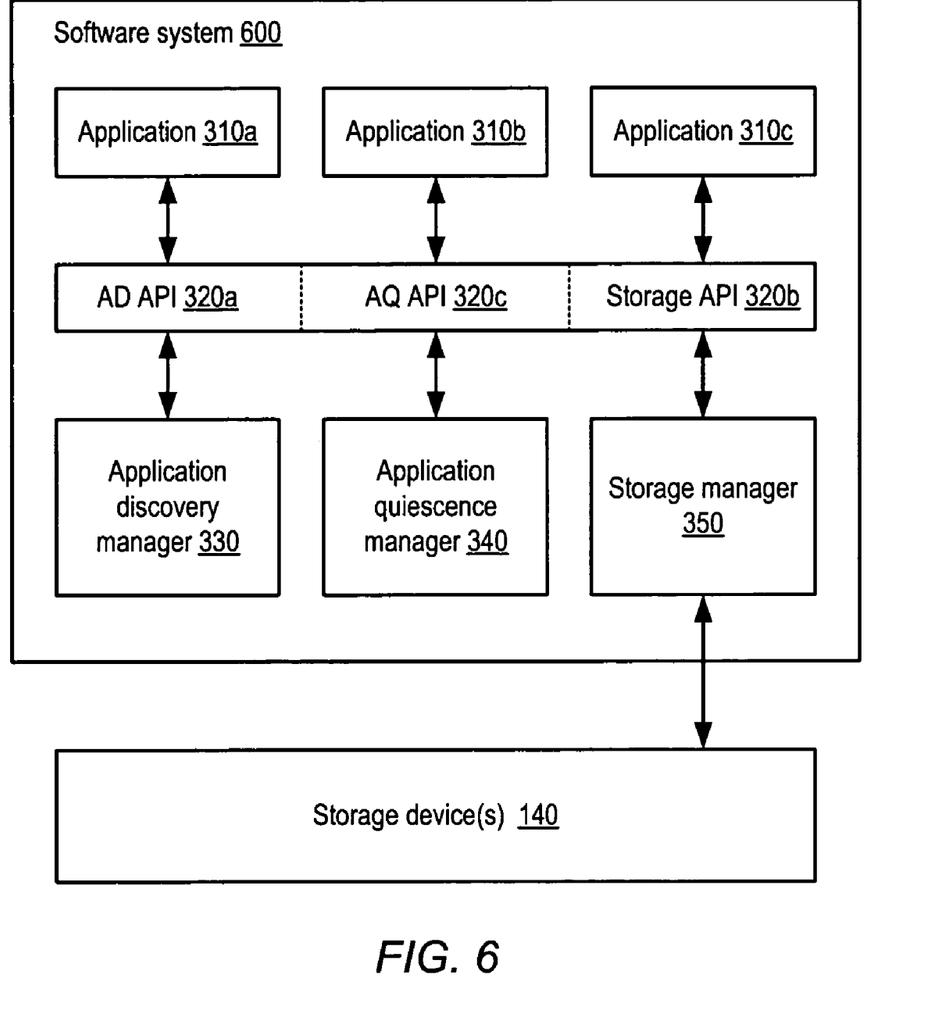
FIG. 6 is a block diagram illustrating one embodiment of a software system configured to provide an application discovery facility and a facility for coordinating the quiescence of applications.

FIG. 6 illustrates one embodiment of a software system configured to implement both an application discovery facility and an application quiescence facility. Software system 600 includes a plurality of applications 310*a-c* as well as an application discovery (AD) manager 330, an application quiescence (AQ) manager 340 and a storage manager 350. Applications 310*a-c* are configured to communicate with AD manager 330, AQ manager 340, and storage manager 350 via respective application programming interfaces AD API 320*a*, AQ API 320*c*, and storage API 320*b*. Storage manager 350 is configured to manage access to one or more of the various storage devices 140 of system 100 illustrated in FIG. 1.

Each of the elements of software system 600 may be illustrative of the corresponding elements illustrated in FIG. 2 and FIG. 4 and described previously. Like those embodiments, all of the components of software system 600 may be configured to operate on a single computer system 110 or server 150 of system 100 in some embodiments, while in other embodiments various components of software system 400 may be distributed throughout system 100. It is also contemplated that in some embodiments, AD manager 330 and AQ manager 340 may be implemented as a single module or incorporated into a different module, such as storage manager 350, for example.

In the illustrated embodiment, AD manager 330 and AQ manager 340 may be configured to work cooperatively. For example, AD manager 330 may be configured to detect the presence of various applications 310 within software system 600, as well as to identify various resources associated with such applications, as previously described. Additionally, AD manager 330 may be configured to specifically identify applications 310 that expose a quiescence interface that may be used by AQ manager 340. AD manager 330 may be configured to convey some or all of this information to AQ manager 340, which may in turn use the information to identify applications corresponding to resource-based quiescence requests as described above, as well as to determine what applications 310 are capable of responding to quiescence requests. It is noted that the methods of application discovery and quiescence as illustrated in FIG. 3 and FIG. 5, respectively, may each be operable in their various embodiments in software system 600. For example, application discovery may be performed at specified intervals and may convey its findings to the application quiescence process, which may be performed in response to quiescence requests.

Exemplary Computer System Embodiment

Figure 7:
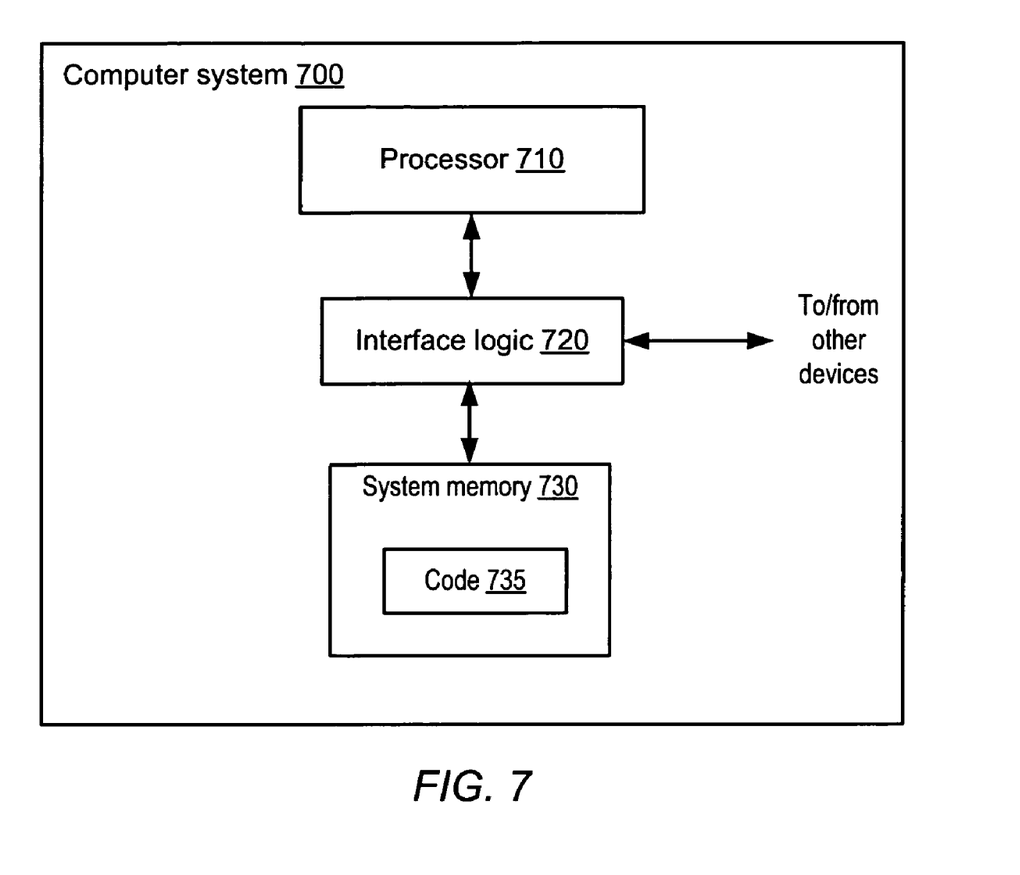
FIG. 7 is a block diagram illustrating one embodiment of a computer system.

Referring once again to FIG. 1, as described above, in various embodiments computer systems 110a-b and server 150 may be configured to execute the various software elements comprising any of the previously described software systems. One exemplary embodiment of a computer system is illustrated in FIG. 7. Computer system 700 may be illustrative of computer systems 110a-b and server 150 of FIG. 1. In the illustrated embodiment, computer system 700 includes a processor 710 coupled to a system memory 730 via interface logic 720.

Processor 710 may be any type of processor. In some embodiments, processor 710 may be a general-purpose microprocessor that implements one or more instruction set architectures such as x86, Power/PowerPC, SPARC, or any other suitable architecture or variant thereof. In other embodiments, processor 710 may be an embedded processor, a digital signal processor, or another processor capable of executing instructions. In the illustrated embodiment, processor 710 may be configured to access system memory 730 or another device to store and retrieve program instructions and data.

Interface logic 720 may be configured as bridge logic. In some embodiments, interface logic 720 may function as a "north bridge" coupling processor 710 and system memory 730, and may be configured to translate memory access requests originating from processor 710 to the appropriate format for system memory 730 and vice versa. In such an embodiment, interface logic 720 may also be configured for coupling to other peripheral buses to which peripheral devices may be attached, such as graphics adapters, storage devices, network interfaces, and other such devices. In some embodiments, interface logic 720 may couple to a "south bridge" interface circuit (not shown), which may be configured for coupling to additional peripheral devices such as pointing devices, keyboards, etc. In other embodiments, interface logic 720 may incorporate all peripheral interface logic in addition to providing a memory interface. It is contemplated that in some embodiments, all or part of interface logic 720 may be incorporated into processor 710.

System memory 730 may include any of various types of memory technologies, or combinations thereof. In some embodiments, system memory 730 may be largely comprised of some variant of synchronous dynamic RAM (SDRAM), but in other embodiments static RAM (SRAM) or another RAM technology may be used. In some embodiments, system memory 730 may include additional resources for error detection and/or correction, such as parity bits or error correcting code (ECC) bits, which may be separate from resources dedicated to storage of data or instructions.

In some embodiments, system memory 730 may be one embodiment of a computer-accessible medium configured to store program instructions executable by processor 710 as well as data accessible by processor 710, which program instructions and data may comprise any software program, module or application. Such program instructions and data are illustrated as code 735 within system memory 730 in the illustrated embodiment. However, in other embodiments, program instructions and/or data may be received, sent or stored upon different types of computer-accessible media. Generally speaking, a computer-accessible medium may include storage media or memory media such as magnetic or optical media, e.g., disk or CD-ROM, such as may be coupled to computer system 700 through interface logic 720, for example. A computer-accessible medium may also include volatile or non-volatile media such as RAM (e.g. SDRAM, DDR SDRAM, RDRAM, SRAM, etc.), ROM, etc, such as may be included within system memory 730. Further, a computer-accessible medium may include transmission media or signals such as electrical, electromagnetic, or digital signals, conveyed via a communication medium such as network and/or a wireless link.

In some embodiments where processor 720 is configured to execute code corresponding to a quiescence manager such as AQ manager 340 of FIG. 4, processor 720 may be a means for coordinating quiescence of applications in response to receiving a quiescence request. Equivalent such means may include each of the various exemplary embodiments of processor 720 described above. Equivalent such means may also include computer system 700, computer systems 110a-b and server 150 illustrated in FIG. 1, and each of the various exemplary embodiments of these systems described above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a storage device configured to store data;
   a plurality of computer-implemented applications, each configured to issue input/output (I/O) requests to said storage device; and
   a computer-implemented quiescence manager configured to provide a quiescence application programming interface (API) for said plurality of applications and to coordinate quiescence of at least a portion of said plurality of applications in response to receiving a quiescence request from a particular application of said plurality of applications via said quiescence API;
   wherein to coordinate quiescence of a given application of said at least a portion of said plurality of applications, said quiescence manager is configured to invoke a quiescence interface provided by said given application;
   wherein in response to said quiescence manager invoking said quiescence interface, said given application is configured to notify said quiescence manager upon completion of outstanding I/O requests issued by said given application; and
   wherein in response to determining that each of said at least a portion of said plurality of applications has entered a quiescent state, said quiescence manager is further configured to notify said particular application of completion of said quiescence request.

2. The system as recited in claim 1, wherein said given application is configured to internally buffer data, and wherein in response to said quiescence manager invoking said quiescence interface, said given application is further configured to flush said internally buffered data.

3. The system as recited in claim 1, wherein said quiescence request specifies a given resource set, wherein said quiescence manager is further configured to coordinate quiescence of said at least a portion of said plurality of applications with respect to said given resource set in response to receiving said quiescence request, and wherein in response to said quiescence manager invoking said quiescence interface, said given application is further configured to notify said quiescence manager upon completion of outstanding I/O requests issued by said given application that correspond to said resource set.

4. The system as recited in claim 1, wherein said quiescence API is platform independent.

5. The system as recited in claim 1, wherein said given application comprises a plurality of components distributed for operation among a plurality of computer systems, and wherein said quiescence manager is further configured to distribute coordination of quiescence of said given application among said plurality of computer systems.

6. The system as recited in claim 1, wherein said quiescence manager is further configured to process multiple concurrent quiescence requests.

7. The system as recited in claim 1, further comprising a storage manager configured to create a fixed image of a given subset of said data subsequent to coordinating quiescence of said at least a portion of said plurality of applications.

8. The system as recited in claim 1, further comprising an application discovery manager configured to detect dependencies among said plurality of applications.

9. A method, comprising:
  each of a plurality of computer-implemented applications issuing input/output (I/O) requests to a storage device;
  a computer-implemented quiescence manager providing a quiescence application programming interface (API) for said plurality of applications and receiving a quiescence request from a particular application of said plurality of applications via said quiescence API;
  said quiescence manager coordinating quiescence of at least a portion of said plurality of applications in response to receiving said quiescence request, wherein said quiescence manager coordinating quiescence of a given application of said at least a portion of said plurality of applications comprises said quiescence manager invoking a quiescence interface provided by said given application;
  in response to said quiescence manager invoking said quiescence interface said given application notifying said quiescence manager upon completion of outstanding I/O requests issued by said given application; and
  in response to determining that each of said at least a portion of said plurality of applications has entered a quiescent state, said quiescence manager notifying said particular application of completion of said quiescence request.

10. The method as recited in claim 9, wherein said given application is further configured to internally buffer data, and wherein the method further comprises said given application flushing said internally buffered data in response to said quiescence manager invoking said quiescence interface.

11. The method as recited in claim 9, wherein said quiescence request specifies a given resource set, wherein the method further comprises said quiescence manager coordinating quiescence of said at least a portion of said plurality of applications with respect to said given resource set in response to receiving said quiescence request, and wherein the method further comprises: in response to said quiescence manager invoking said quiescence interface, said given application notifying said quiescence manager upon completion of outstanding I/O requests issued by said given application that correspond to said resource set.

12. The method as recited in claim 9, wherein said quiescence API is platform independent.

13. The method as recited in claim 9, wherein said given application comprises a plurality of components distributed for operation among a plurality of computer systems, and wherein the method further comprises said quiescence manager distributing coordination of quiescence of said given application among said plurality of computer systems.

14. The method as recited in claim 9, further comprising creating a fixed image of at least a portion of data stored on said storage device subsequent to coordinating quiescence of said at least a portion of said plurality of applications.

15. The method as recited in claim 9, further comprising detecting dependencies among said plurality of applications.

16. A computer-accessible storage medium comprising program instructions, wherein the program instructions are computer-executable to implement:
  a quiescence manager providing a quiescence application programming interface (API) for a plurality of applications wherein each of said plurality of applications is configured to issue input/output (I/O) requests to a storage device;
  said quiescence manager receiving a quiescence request from a particular application of said plurality of applications via said quiescence API; and
  said quiescence manager coordinating quiescence of at least a portion of said plurality of applications in response to receiving said quiescence request, wherein said quiescence manager coordinating quiescence of a given application of said at least a portion of said plurality of applications comprises said quiescence manager invoking a quiescence interface provided by said given application, and wherein in response to said quiescence manager invoking said quiescence interface said given application is configured to notify said quiescence manager upon completion of outstanding I/O requests issued by said given application; and
  in response to determining that each of said at least a portion of said plurality of applications has entered a quiescent state, said quiescence manager notifying said particular application of completion of said quiescence request.

17. The computer-accessible storage medium as recited in claim 16, wherein said given application is further configured to internally buffer data, and wherein said given application is further configured to flush said internally buffered data in response to said quiescence manager invoking said quiescence interface.

18. The computer-accessible storage medium as recited in claim 16, wherein said quiescence request specifies a given resource set, wherein the program instructions are further executable to implement said quiescence manager coordinating quiescence of said at least a portion of said plurality of applications with respect to said given resource set in response to receiving said quiescence request, and wherein in response to said quiescence manager invoking said quiescence interface, said given application is further configured to notify said quiescence manager upon completion of outstanding I/O requests issued by said given application that correspond to said resource set.

19. The computer-accessible storage medium as recited in claim 16, wherein said quiescence API is platform independent.

20. The computer-accessible storage medium as recited in claim 16, wherein said given application comprises a plurality of components distributed for operation among a plurality of computer systems, and wherein said program instructions are further executable to implement said quiescence manager distributing coordination of quiescence of said given application among said plurality of computer systems.

21. The computer-accessible storage medium as recited in claim 16, wherein said program instructions are further executable to create a fixed image of at least a portion of data stored on said storage device subsequent to coordinating quiescence of said at least a portion of said plurality of applications.

22. The computer-accessible storage medium as recited in claim 16, wherein said program instructions are further executable to detect dependencies among said plurality of applications.

23. A system, comprising:
   means for storing data; and
   means for coordinating quiescence of at least a portion of a plurality of applications in response to receiving a quiescence request from a particular application of said plurality of applications via a quiescence application programming interface (API) provided for said plurality of applications by said quiescence coordinating means;
   wherein each of said plurality of applications is configured to issue input/output (I/O) requests to said data storing means;
   wherein to coordinate quiescence of a given application of said at least a portion of said plurality of applications, said quiescence coordinating means is configured to invoke a quiescence interface provided by said given application;
   wherein in response to said quiescence coordinating means invoking said quiescence interface, said given application is configured to notify said quiescence manager upon completion of outstanding ones of the I/O requests issued by said given application; and
   wherein in response to determining that each of said at least a portion of said plurality of applications has entered a quiescent state, said quiescence coordinating means is further configured to notify said particular application of completion of said quiescence request.

* * * * *